United States Patent
Lynam et al.

(10) Patent No.: US 8,532,115 B2
(45) Date of Patent: *Sep. 10, 2013

(54) NEGOTIATED SECURE FAST TABLE LOOKUPS FOR PROTOCOLS WITH BIDIRECTIONAL IDENTIFIERS

(75) Inventors: Jonathan A. Lynam, San Jose, CA (US); Srikrishnan Subramanian, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 107 days.

This patent is subject to a terminal disclaimer.

(21) Appl. No.: 13/196,823

(22) Filed: Aug. 2, 2011

(65) Prior Publication Data

US 2011/0286460 A1     Nov. 24, 2011

Related U.S. Application Data

(63) Continuation of application No. 12/465,569, filed on May 13, 2009, now Pat. No. 7,990,976.

(51) Int. Cl.
    *H04L 12/28*     (2006.01)
(52) U.S. Cl.
    USPC ...................... 370/395.32; 370/329
(58) Field of Classification Search
    USPC ................... 370/392, 395.2–395.32
    See application file for complete search history.

(56) References Cited

U.S. PATENT DOCUMENTS

| | | | | |
|---|---|---|---|---|
| 7,206,864 B2 * | 4/2007 | Enko et al. | ..................... | 709/249 |
| 7,333,514 B2 * | 2/2008 | Anehem et al. | ............... | 370/474 |
| 7,584,262 B1 * | 9/2009 | Wang et al. | ..................... | 709/217 |
| 7,688,819 B2 * | 3/2010 | Ramaiah et al. | ............... | 370/389 |
| 7,813,339 B2 * | 10/2010 | Bar-David et al. | ............ | 370/389 |
| 2003/0163577 A1 | 8/2003 | Moon et al. | | |
| 2005/0018682 A1 * | 1/2005 | Ferguson et al. | ............. | 370/392 |
| 2005/0273592 A1 | 12/2005 | Pryor et al. | | |
| 2009/0172184 A1 * | 7/2009 | Wason et al. | ................. | 709/234 |
| 2010/0023726 A1 | 1/2010 | Aviles | | |

OTHER PUBLICATIONS

International Search Report and Written Opinion, Application No. PCT/IB2010/052138, dated Feb. 8, 2011, 9 pages.
J. Lau et al., "Layer Two Tunneling Protocol", Version 3 (L2TPv3), Network Working Group, Request for Comments: 3931, Category: Standards Track, Lucent Technologies, Mar. 2005, 94 pages.

* cited by examiner

*Primary Examiner* — Hassan Kizou
*Assistant Examiner* — Emmanuel Maglo
(74) *Attorney, Agent, or Firm* — Blakely Sokoloff Taylor & Zafman, LLP

(57) ABSTRACT

During connection establishments for a protocol with bidirectional identifiers, connection data is allocated, the locally selected identifier is a pointer to the allocated connection data, and a mathematical transformation is applied to the pointer. The pointer and a result of the mathematical transformation are included in a first and second portion of the connection establishment packets respectively. Upon receipt of a data packet for that protocol, a first and second portion of the data packet (which correspond to the first and second portion of the connection establishment packets) are extracted. The same mathematical transformation used during connection establishment is applied to the data extracted from the first portion of the data packet. The result of that mathematical transformation is compared with the data extracted from the second portion of the data packet. If the values match, then the data extracted from the first portion is trusted and dereferenced to access the allocated connection data associated with that data packet.

18 Claims, 9 Drawing Sheets

NEGOTIATED SECURE FAST TABLE LOOKUPS FOR PROTOCOLS WITH BIDIRECTIONAL IDENTIFIERS

CROSS-REFERENCE TO RELATED APPLICATIONS

This application is a continuation of application Ser. No. 12/465,569, filed May 13, 2009, which is hereby incorporated by reference.

BACKGROUND

1. Field

Embodiments of the invention relate to the field of network processing; and more specifically, to secure fast table lookups for protocols with bidirectional identifiers.

2. Background

Network elements (e.g., routers, switches, etc.) spend a large percentage of their packet processing time performing lookups. For example, network elements commonly lookup one or more identifiers in a given packet to identify corresponding data structures which include data necessary for further processing of the packet.

A class of network protocols exist which exchange locally selected identifiers (which have local significance) as part of a connection establishment sequence. The locally selected identifiers are typically chosen as monotonically increasing numbers or randomly selected numbers. These locally selected identifiers are typically sent in the headers of subsequent packets between the network elements. When a network element selects an identifier for a connection, it inserts the connection data into a table (e.g., a hash table, a balanced binary tree, etc.) using the corresponding local identifier as a key. When the network element receives a data packet, it extracts the local identifier from the packet and uses it as a lookup key to retrieve the connection data from the table.

For example, in the Layer Two Tunneling Protocol version 3 (L2TPv3), defined in request for comments (RFC) 3931, March 2005, the LAC (L2TP Access Concentrator) and the LNS (L2TP Network Server) exchange locally selected identifiers (session identifiers) during each connection establishment sequence. The session data for each session is inserted into a session data structure using the session identifier as a key. Each data packet transmitted between the LAC and LNS includes a session identifier which is used as a lookup key to the session data structure. The information in the session data structure is necessary for correctly processing the packet.

Current lookup mechanisms for identifying corresponding data structures from identifiers in packets include using hash tables or binary trees. Binary trees provide good scalability and consume a predictable amount of memory (e.g., an average of $O(\log_2 N)$ (big O notation) number of memory access are required to locate the corresponding connection data). Hash tables can provide predictable fast lookup (e.g., O(N/B)), but the memory wasted for unused hash table buckets can be expensive for large data sets and hash tables can require large extents of contiguous memory to be traded off to achieve good performance.

The lookup time using either a binary tree lookup mechanism or a hash table lookup mechanism is not constant. That is, the lookup time varies from element to element even in the same binary tree or hash table. Additionally, the lookup time using a binary tree or a hash table lookup mechanism typically increases as the number of connections increases.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
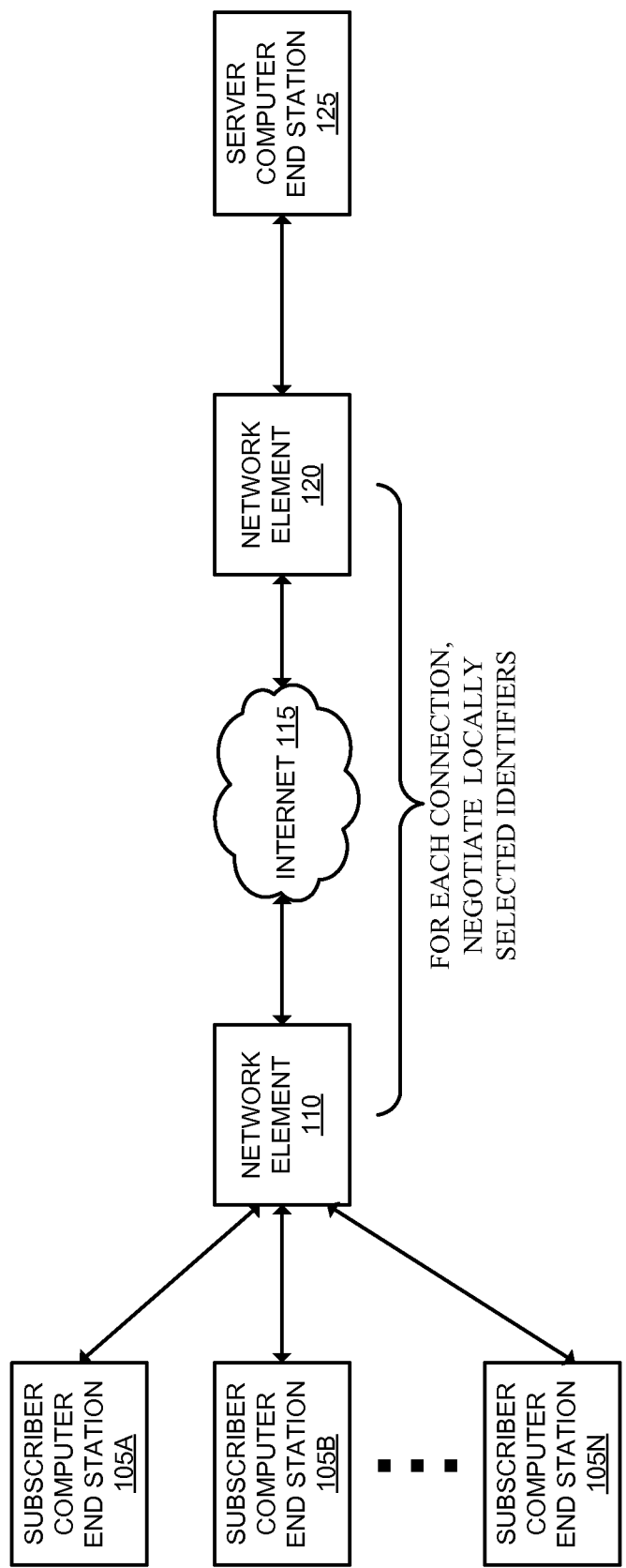
FIG. 1 illustrates an exemplary network according to one embodiment of the invention.

In the following description, numerous specific details are set forth. However, it is understood that embodiments of the invention may be practiced without these specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more network elements. Such network elements store and communicate (internally and/or with other network elements and computer end stations over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such network elements typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given network element typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

A method and apparatus for negotiated secure fast table lookups for protocols with bidirectional identifiers is described. In one embodiment of the invention, during each connection establishment sequence for a connection of a protocol with bidirectional identifiers, a network element allocates connection data for the connection, sets the locally significant identifier as a pointer to the allocated connection data, applies a mathematical transformation to the locally significant identifier, includes the locally significant identifier and a result of the mathematical transformation in a connection establishment packet, and transmits the connection establishment packet to the peer network element. When the network element receives data packets from the peer network element, the network element extracts the locally selected identifier and the result of the mathematical transformation, applies the same mathematical transformation to the extracted locally selected identifier, and compares the result of the mathematical transformation to the extracted locally selected identifier. If they match, the network element dereferences the value of the extracted locally selected identifier to access the connection data that corresponds to the packet and continues processing. If they do not match, other action is taken (e.g., the packet is dropped).

FIG. 1 illustrates an exemplary network according to one embodiment of the invention. The network illustrated in FIG. 1 includes the subscriber computer end stations 105A-105N, coupled with the network element 110. The network element 110 is coupled, through the Internet 115, to the network element 120. The network element 120 is coupled with the server computer end station. In one embodiment, the subscriber computer end stations 105A-105N connect with the server computer end station 125 through the network elements 110 and 120 (e.g., each subscriber computer end station 105A-105N has a connection with the server computer end station). For example, the subscriber computer end stations 105A-105N are remote users of the server computer end station (e.g., a corporate site).

The network elements 110 and 120 are peers that support protocols with bidirectional identifiers (e.g., L2TP, etc.). The network elements 110 and 120 negotiate locally selected identifiers during connection establishment sequences for those protocols. For example, during connection establishment sequences for those protocols, the network elements 110 and 120 exchange a series of connection establishment packets which negotiate locally selected identifiers. Thereafter, the network elements 110 and 120 include those locally selected identifiers in data packets that are transmitted between them. Thus for a given connection there can be unique local identifiers given by each end of the control connection (e.g., the network elements 110 and 120) that are used during the life of the connection.

For example, during a connection establishment sequence for the subscriber computer end station 105A, the network element 110 selects an identifier that has local significance that it uses to identify the connection and the network element 120 selects an identifier that has local significance that it uses to identify the connection. These local identifiers are used to identify connection data allocated for the connection that indicates how data packets for that connection are treated (e.g., the connection data can include quality of service (QoS) parameters, access control lists, routing pointers to routing tables, etc.). During transmission of data packets for the connection for the subscriber computer end station 105A, the network element 110 includes the local identifier selected by the network element 120 when transmitting data packets to the network element 120, and the network element 120 includes the local identifier selected by the network element 110 when transmitting data packets to the network element 110. In one embodiment, the network element 110 is a LAC and the network element 120 is a LNS and the communicate using L2TP, and the locally selected identifiers are included in the session ID field of the L2TP header.

As will be described in greater detail later herein, at least one of the network elements 110 and 120 selects the local identifiers to be pointers to connection data allocated in memory. For example, for the connection for the subscriber computer end station 105A, the network element 120 selects the local identifier to be a pointer to the connection data allocated in memory for the subscriber computer end station 105A. A pointer references a value or location in memory, and when that value or location is needed, the pointer is dereferenced. As will be described later herein, a network element selecting the local identifier to be a pointer to the connection data for a connection allows that network element to quickly locate and access the connection data allocated for that connection (e.g., by dereferencing the pointer). Thus, unlike typical prior art mechanisms which select a value for the local identifier which is not a pointer value (e.g., it is typically a random number or a monotonically increasing number) which then requires a standard lookup mechanism to locate and access the connection data for that connection (e.g., a binary tree search mechanism, a hash table search, etc.), embodiments of the invention allow for network elements to select a pointer to the allocated connection data.

Also during the connection establishment sequences, the network elements 110 and 120 can negotiate data included in optional fields. For example, in L2TP, the network elements 110 and 120 can negotiate data in the cookie field of the L2TP header during connection establishment sequences. Similarly to the negotiation of the locally selected identifiers, the data in the optional field has local significance and will be included in data packets transmitted between the network elements 110 and 120. Using the above example of establishing a connection for the subscriber computer end station 105A, the network element 110 and 120 can each select data to be included in the optional field of connection establishment packets. During transmission of data packets for the connection for the subscriber computer end station 105A, the network element 110 will include the data in the optional field selected by the network element 120 when transmitting data packets to the network element 120, and the network element 120 will include the data in the optional field selected by the network element 110 when transmitting data packets to the network element 110.

As will be described in greater detail later herein, at least one of the network elements 110 and 120 (the at least one network element that selected the local identifiers to be pointers to connection data allocated in its memory) includes a result of a mathematical transformation of those local identifiers in its option field (e.g., at least a portion of a hash digest of those local identifiers). As will be described in greater detail later herein, a network element that includes results of the mathematical transformations of the pointers during connection establishment allows that network element to verify that the data included in the locally selected identifier field (e.g., the session ID field in L2TP) can be trusted and dereferenced to locate and access the connection data allocated in its memory. By way of example, for the connection for the subscriber computer end station 105A, the network element 120 negotiates with the network element 110 a result of a mathematical transformation of the pointer selected as the local identifier for that connection (e.g., the network element 120 includes the result in the option field of the connection establishment packet).

It should be understood that embodiments of the invention are not limited to including the pointer to the allocated connection data in the locally selected identifier field as the pointer can be located in different locations in the connection establishment packet. In addition, it should be understood that embodiments of the invention are not limited to including a result of a mathematical transformation of a pointer to allocated connection data in an option field as the result can be located in different locations in the connection establishment packet. For example, in some embodiments, the pointer to allocated connection data and a result of a mathematical transformation of that pointer to allocated connection data are located within a same field of a connection establishment packet (e.g., in L2TP the pointer to allocated connection data and a result of a mathematical transformation of that pointer (at least a portion of the result) can be located in the session ID field or the cookie field, etc.). Thus, in some embodiments, the pointer to allocated connection data is included in a first portion of the connection establishment packet and a result of a mathematical transformation of that pointer is included in a second portion of that connection establishment packet.

Figure 2:
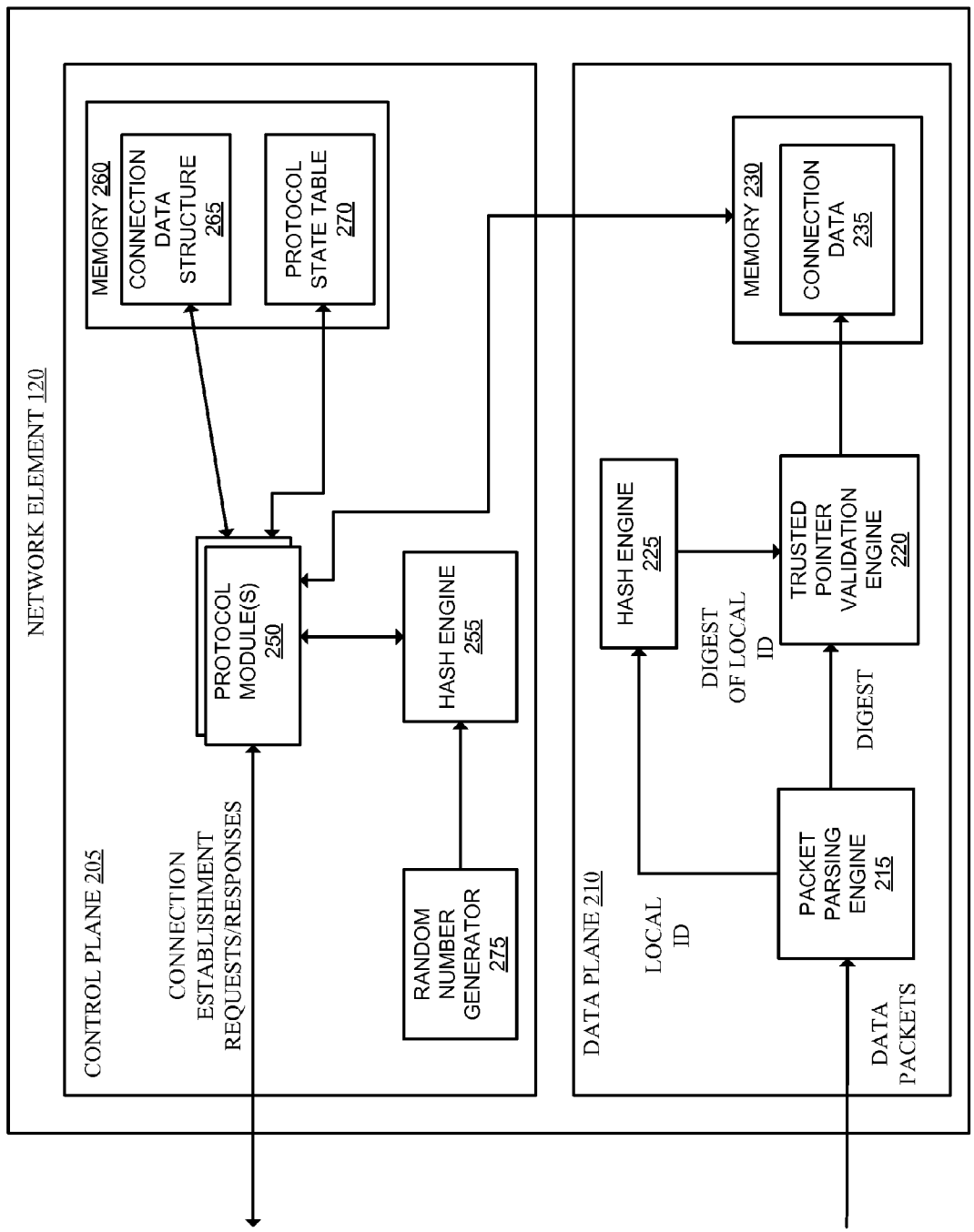
FIG. 2 illustrates an exemplary network element for secure fast table lookups for protocols with bidirectional identifiers according to one embodiment of the invention.

FIG. 2 illustrates an exemplary network element for secure fast table lookups for protocols with bidirectional identifiers according to one embodiment of the invention. It should be understood that the architecture of the network element 120 illustrated in FIG. 2 is exemplary, and other architectures may be used in embodiments of the invention described herein.

As illustrated in FIG. 2, the network element 120 includes the control plane 205 coupled with the data plane 210. The control plane 205 establishes connections for the protocols with bidirectional identifiers with other network elements, including allocating connection data for the connections and assigning locally selected identifiers for those connections. The control plane 205 includes the protocol module(s) 250 (e.g., each being a protocol that includes a negotiation of bidirectional identifiers), coupled with the memory 260. The protocol module(s) 250 are also each coupled with the hash engine 255.

The memory 260, which can be any type of non-volatile or volatile memory, includes the connection data structure 265 and the protocol state table 270. The connection data structure 265 includes connection data for each connection (e.g., connection specific parameters and state) that indicate how packets of that connection are treated. For example, the connection data can include quality of service (QoS) parameters, access control lists, routing pointers to routing tables, which line card the connection is on, the memory address of the line card where the connection data is assigned, etc. The protocol state table 270 includes information regarding the state of the protocol module(s) 250 including, nonce values, digests, validation profiles, etc. A subset of the connection data 265 is downloaded to the data plane 210 according to one embodiment of the invention.

During each connection establishment sequence, which is typically initiated in response to receipt of a connection establishment request (e.g., sent from a subscriber computer end station or from a peer network element on behalf of the subscriber computer end station), the protocol module(s) 250 allocate connection data in memory of the data plane 210 for the connection. For example, the protocol module(s) 250 allocate connection data in the memory 230 of the data plane 210. If the data plane 210 includes multiple line cards, the protocol module(s) 250 allocate connection data in the memory of one of those line cards (e.g., the line card which received the connection establishment request and/or which will process data packets corresponding to the received connection establishment request). For example, with reference to claim 1, the protocol module(s) 250 can receive connection establishment requests from the network element 110 on behalf of the subscriber computer end stations 105A-105N.

In one embodiment, the protocol module(s) 250 allocate connection data in a specific portion of the memory 230 of the data plane 210. For example, a portion of the memory 230 may be dedicated for storing connection data.

The protocol module(s) 250 also select a local identifier for each connection during the connection establishment sequences. For example, the protocol module(s) 250 generates a unique local identifier for each connection of the subscriber computer end stations 105A-105N. In one embodiment, the generated local identifier is a pointer to the allocated connection data for that connection. The pointer value may be different in different embodiments of the invention (e.g., the pointer value can be a memory address for the allocated connection data, one or more indirections to the memory address for the allocated connection data, etc.) The protocol module(s) 250 cause an indication of the generated local identifier to be stored in the connection data 265. As will be described later herein, the generated local identifier will be negotiated with a peer network element of the network element 120 (e.g., the network element 110) as part of the protocol defined connection establishment sequence.

The protocol module(s) 250 also causes a mathematical transformation to be applied to the generated local identifier for each connection to act as a validation signature of the pointer selected as the local identifier. In one embodiment, the mathematical transformation is a cryptographic transformation (e.g., a one-way hash, symmetric encryption, asymmetric encryption, etc.). For example, the protocol module(s) 250 provides the generated local identifier to the hash engine 255 to generate a hash digest of the generated local identifier. According to one embodiment, the hash engine 255 also uses a random number generated by the random number generator 275 as a nonce when generating the digest. In one embodiment, the same random number is used for each connection of a protocol over a given time period. The nonce used for the connection is stored in the protocol state table 270.

The protocol module(s) 250 generate connection establishment response packets (responsive to the connection establishment requests) and encode the generated local identifier and the result of the mathematical transformation of the generated local identifier (the hash digest) in those response packets. The generated local identifier is included in a first portion of the connection establishment response packet and the result of the mathematical transformation is included in a second portion of the connection establishment packet. For example, in some embodiments where the protocol is L2TP, the generated local identifier is included in the session ID field and the result of the mathematical transformation is included in the cookie field. It should be understood that the first and second portions of the connection establishment packet may be in the same field or may overlap fields. With reference to FIG. 1, for each connection, the connection establishment packet sent from the network element 120 to the network element 110 includes the local identifier generated by the network element 120 for that connection and the result of the mathematical transformation of that local identifier.

The data plane 210 receives and processes data packets. For example, with reference to FIG. 1, the data plane 210 receives and processes data packets between the subscriber computer end stations 105A-105N and the server computer end station 125 for the connections for those protocols with bidirectional identifiers. Packets received from the network element 110 for protocols with bidirectional identifiers include the identifiers locally generated by the network element 120. The data plane 210 includes the packet parsing engine 215, the trusted pointer validation engine 220, the hash engine 225, and the memory 230. In some embodiments, the data plane 210 includes a plurality of line cards, where each line card includes a packet parsing engine, a trusted pointer validation engine, a hash engine, and a memory.

The packet parsing engine 215 receives and parses data packets. For example, the packet parsing engine 215 determines which protocol the packet belongs, and writes the data of the packet to packet buffer memory. If the packet is for a protocol with bidirectional identifiers, (e.g., L2TP, etc.) the packet parsing engine 215 extracts a first portion of the packet (which is written to packet buffer memory) and extracts a second portion of the packet (which is also written to packet buffer memory). In one embodiment, the first and second portions of the data packet corresponds with the first and second portions of the connection establishment request packet respectively. In one embodiment, the validation profile defines the location of the first and second portion of the data packet and is programmed to the packet parsing engine 215. In another embodiment, the packet's protocol determines the location of the first and second portion of the packet. For example, if the protocol is L2TP, in one embodiment the first portion is the session ID field of the packet header, and the second portion is the cookie field of the packet header.

The hash engine 225 applies a mathematically transformation using the same mathematical transformation as was used in creation of the connection establishment packets (e.g., the hash engine 225 applies the same hashing algorithm as the hash engine 255 in the control plane 205). The result of the mathematical transformation is provided to the trusted pointer validation engine 220. If a random number was used in the creation of the connection establishment packets, then that same random number is used by the hash engine 225 when applying the mathematical transformation.

The trusted pointer validation engine compares the data extracted from the second portion of the packet (e.g., the data in the cookie field for L2TP) with the result of the mathematical transformation of the data extracted from the first portion of the packet. If the values match, then the data extracted from the first portion of the packet is trusted as a pointer to connection data in the memory 230. The pointer is then used to directly index into the memory 230 to locate the allocated connection data by dereferencing the pointer. The data plane 210 continues processing after locating the connection data. If the values do not match, other action is taken (e.g., the packet is dropped, the packet is directed to the control plane for further processing, etc.).

Figure 3:
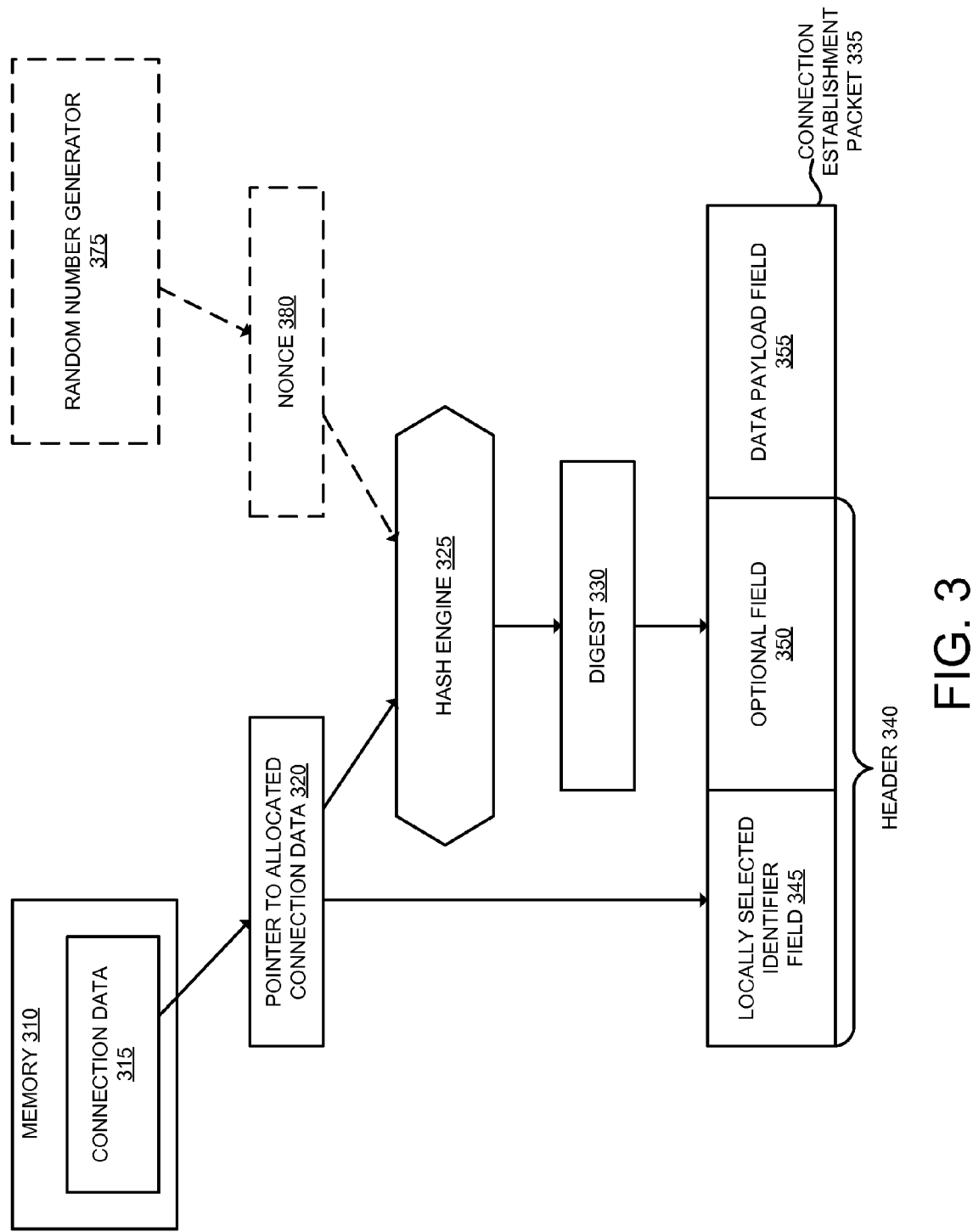
FIG. 3 illustrates generating a trusted pointer as a local identifier for those protocols with bidirectional identifiers according to one embodiment of the invention.

FIG. 3 illustrates generating a trusted pointer as a local identifier for those protocols with bidirectional identifiers according to one embodiment of the invention. The operations described in reference to FIG. 3 are performed during connection establishment sequences (e.g., responsive to receiving a connection establishment request) for protocols with bidirectional identifiers (e.g., L2TP, etc.). The connection data 315 is allocated in the memory 310 for a given connection. In one embodiment, the connection data 315 is allocated in a portion of the memory 310 dedicated for the protocol. In one embodiment, the memory 310 is included on a line card of the network element.

The pointer to the allocated connection data 320 (which is a pointer to the connection data 315) is created and provided to the hash engine 325. In one embodiment the pointer to the allocated connection data 320 is a memory address of the connection data 315 is stored in the memory 310, while in other embodiments the pointer to the allocated connection data 320 is a pointer to the memory address. The pointer to the allocated connection data 320 will also be used as the locally selected identifier in the connection establishment packet as will be described later herein. In some embodiments, the random number generator 375 generates the nonce 380 (a random number) which is provided to the hash engine 325.

The hash engine 325 applies a mathematical transformation on the pointer to the allocated connection data 320 and the nonce 380 (if provided) to produce the digest 330 (a result of the hashing algorithm). Different hashing algorithms may be used in different embodiments of the invention (e.g., SHA-0, SHA-1, SHA-256, SHA-384, SHA-512, MD2, MD4, MD5, RIPEMD-160, RIPEMD-128/256/320, HAS160, HAS-V, HAVAL, Tiger, Panama, Snefru-2, GOST-Hash, BRS-H1/H20, Whirpool, etc.). It should also be understood that other encryption schemes can be used to encrypt the pointer to the allocated connection data 320 instead of, or in addition to, the hashing algorithms described above.

The pointer to the allocated connection data 320 and the digest 330 (the result of the hash of the pointer to the allocated connection data 320 and optionally the nonce 380) are included in a first and second portion of the connection establishment packet 335. The connection establishment packet 335 includes the header 340, which includes the locally selected identifier field 345 and the optional field 350, and the data payload field 355. If the connection establishment packet 335 is for the L2TP protocol, the locally selected identifier field 345 corresponds to the session ID field and the optional field 350 corresponds to the cookie field of the L2TP header. As illustrated in FIG. 3, the pointer to the allocated session data 320 is encoded in the locally selected identifier field 345 and the digest 330 is encoded into the optional field 350. Although the connection establishment packet 335 is illustrated as including the optional field 350, it should be understood that in some embodiments the connection establishment packets may not include the optional field 350.

Thus, unlike typical prior art mechanisms which select a value for the local identifier which is not a pointer value (e.g., it is typically a random number or a monotonically increasing number) which then requires a standard lookup mechanism to locate and access the connection data for that connection (e.g., a binary tree search mechanism, a hash table search, etc.), embodiments of the invention allow for network elements to select a pointer to the allocated connection data that can be dereferenced to directly index into memory to locate the allocated connection data (as will be described in greater detail later herein).

Depending on the hash algorithm used, the size of the digest 330 may not be able to completely be encoded into the optional field 350. For example, if the connection establishment packet is for L2TP (e.g., an ICRQ (Incoming-Call-Request) or an ICRP (Incoming-Call-Reply), the optional field 350, which corresponds to the cookie field, is typically 64 bits, while an MD5 hash digest is 128 bits. In such a case, the digest 330 is reduced by an amount to be included in the optional field 350. This can be done in numerous ways (e.g., if the optional field is an N bit field, then the first N bits of the digest 330 may be included in the optional field 350). The amount the digest is reduced and/or the index of the bits of the digest 330 which are included in the optional field 350 is typically the same for each connection establishment packet of the same protocol (and will be used during validation of data packets as will be described in greater detail later herein).

Figure 4:
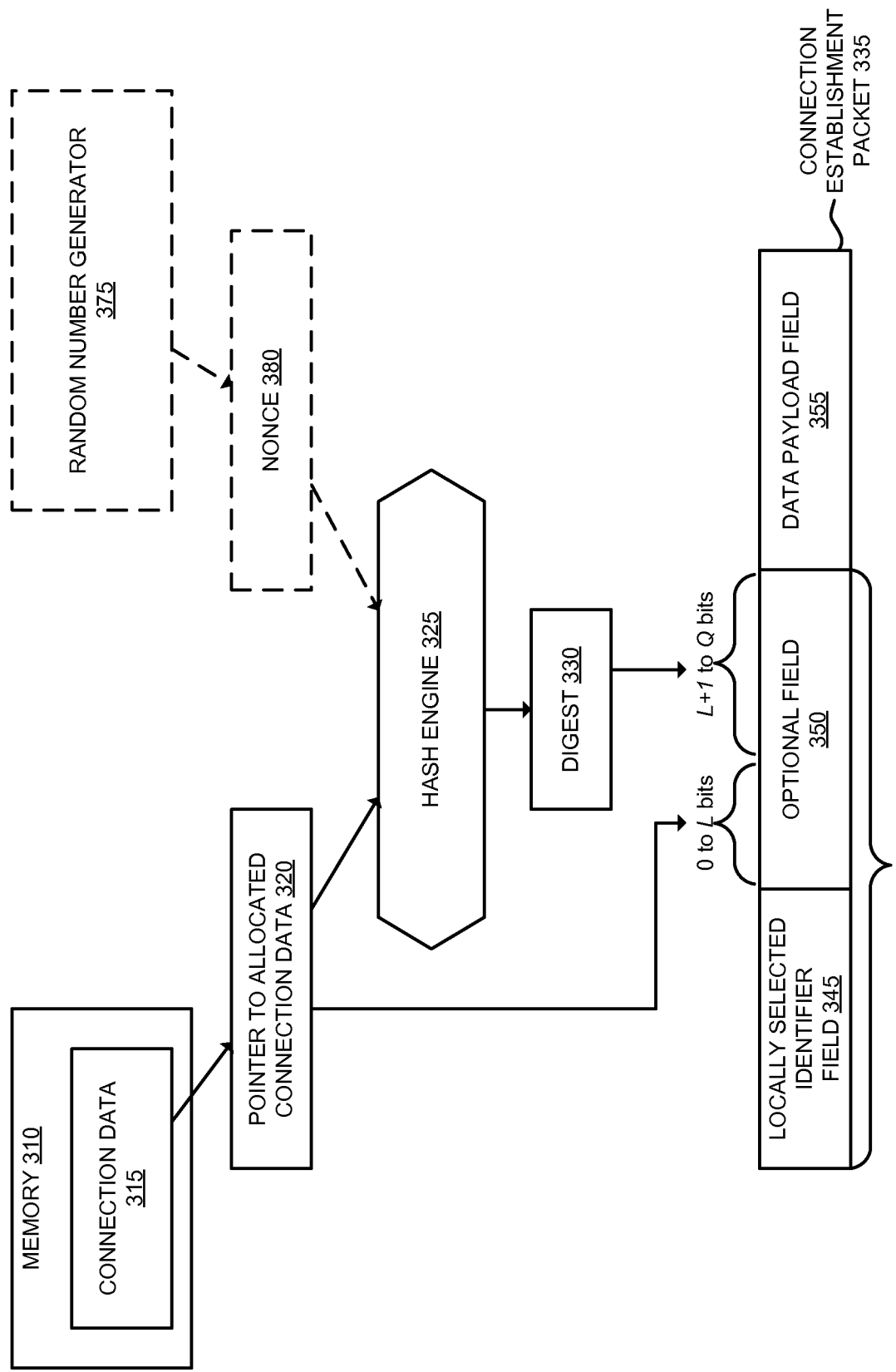
FIG. 4 illustrates an alternative way to generate a local trusted pointer as a local identifier for those protocols with bidirectional identifiers according to one embodiment of the invention.

FIG. 4 illustrates an alternative way to generate a local trusted pointer as a local identifier for those protocols with bidirectional identifiers according to one embodiment of the invention. Similarly as described with reference to FIG. 3, the operations described in reference to FIG. 4 are performed during connection establishment sequences (e.g., responsive to receiving a connection establishment request) for protocols with bidirectional identifiers (e.g., L2TP, etc.).

The operations of FIG. 4 are similar to the operations of FIG. 3 with the exception that the pointer to the allocated connection data 320 is included in a different portion of the connection establishment packet 335 than illustrated in FIG. 3. For example, the pointer to the allocated connection data 320 and the digest 330 are each included in different portions of the optional field 350 (e.g., the pointer to the allocated connection data 320 is encoded in the bits 0 to L of the optional field 350 and the digest 330 is encoded in the bits L+1 to Q bits of the optional field 350).

It should be understood that FIGS. 3 and 4 illustrate examples of the location of the portions of the connection establishment packet 335 that the pointer to the allocated session data 320 and the digest 330 are encoded. However embodiments are not so limited as the pointer to the allocated session data 320 and the digest 330 may be encoded in different portions of the connection establishment packet 335 in other embodiments of the invention.

While in one embodiment of the invention the pointer to the allocated session data 320 is encoded directly in a portion of the connection establishment packet 335, in other embodiments of the invention the pointer to the allocated connection data 320 is obfuscated prior to being included in the connection establishment packet 335 (e.g., the pointer to the allocated connection data 320 is transformed (e.g., the bit values are shifted), the pointer to the allocated connection data 320 is encrypted, the bit values of the pointer of the allocated session data 320 are interspersed among the bit values of the optional field 350, etc.). Similarly, while in one embodiment of the invention the digest 330 (or at least a portion of the digest 330) is encoded directly in a portion of the connection establishment packet 335, in other embodiments of the invention it is obfuscated prior to being included in the connection establishment packet 335 (e.g., the value of the digest is transformed, encrypted, some bits swapped, etc.). As will be described later herein, in one embodiment the line cards are programmed to deobfuscate any obfuscated information in the data packets.

Figure 5:
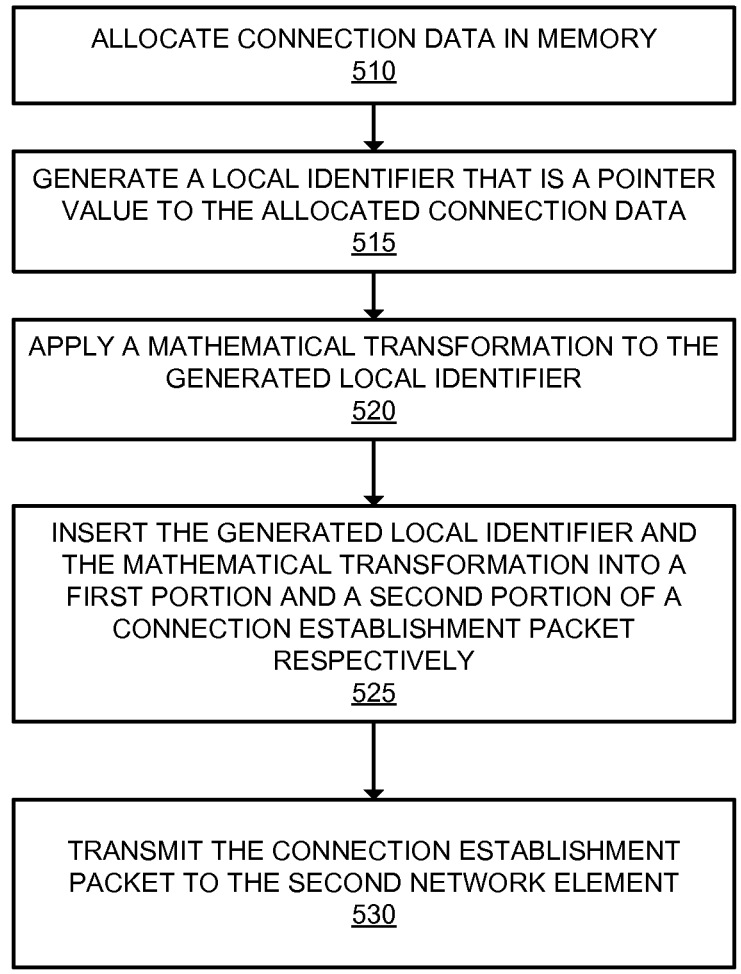
FIG. 5 is a flow diagram illustrating generating a local trusted pointer as a local identifier for those protocols with bidirectional identifiers according to one embodiment of the invention.

FIG. 5 is a flow diagram illustrating generating a local trusted pointer as a local identifier for those protocols with bidirectional identifiers according to one embodiment of the invention. In one embodiment, the operations described in reference to FIG. 5 are performed during connection establishment sequences (e.g., responsive to receiving a connection establishment request) for protocols with bidirectional identifiers (e.g., L2TP, etc.) between network elements. For example, with reference to FIG. 1, the operations performed in FIG. 5 are performed by the network element 110 responsive to receipt of a connection establishment request from one of the subscriber computer end stations 105A-105N or performed by the network element 120 responsive to receipt of a connection establishment request from the network element 120 (e.g., responsive to receipt of a L2TP ICRQ packet).

The operations of FIG. 5 will be described with reference to the exemplary embodiment of FIG. 2. However, it should be understood that the operations of FIG. 5 can be performed by embodiments of the invention other than those discussed with reference to FIG. 2, and the embodiments discussed with reference to FIG. 2 can perform operations different than those discussed with reference to FIG. 5.

At block 510, one of the protocol module(s) 250 allocates connection data for the connection in the memory 230 of the data plane 210 (e.g., one of the line cards of the network element 120). Flow moves from block 510 to block 515, where that one of the protocol module(s) 250 generates a local identifier that is a pointer value to the allocated connection data for the connection (e.g., a memory address of the allocated connection data in the memory 230, a pointer value to the memory address of the allocated connection data in the memory 230). Flow moves from block 515 to block 520.

At block 520, that one of the protocol module(s) 250 causes the hash engine 255 to apply a mathematical transformation (e.g., a hashing algorithm) to the generated local identifier (the pointer value to the allocated connection data for the connection). According to one embodiment, the hash engine 255 also uses a random number (e.g., supplied by the random number generator 275) when applying the mathematical transformation. Flow moves from block 520 to block 525.

At block 525, that one of the protocol module(s) 250 includes the generated local identifier and the result of the mathematical transformation into a first portion and a second portion of a connection establishment packet respectively. For example, with reference to L2TP, the first portion can be the session ID field and the second portion can be the cookie field (or vice versa). Flow moves from block 525 to block 530 where the control plane 205 transmits the connection establishment packet to the peer network element 110 (e.g., an ICRP packet if the protocol is L2TP).

According to one embodiment, the peer network element receiving the connection establishment packet with the trusted pointer and the signature of the trusted pointer does not process the connection establishment packet differently than usual. Thus, for a given connection, during normal operation the peer network element will include the trusted pointer as the local identifier and the signature of the trusted pointer in each data packet. For example, for a connection for the subscriber computer end station 105A, the network element 110 will include the trusted pointer and the signature of the trusted pointer generated by the network element 120 in each data packet for that connection to the network element 120.

Figure 6:
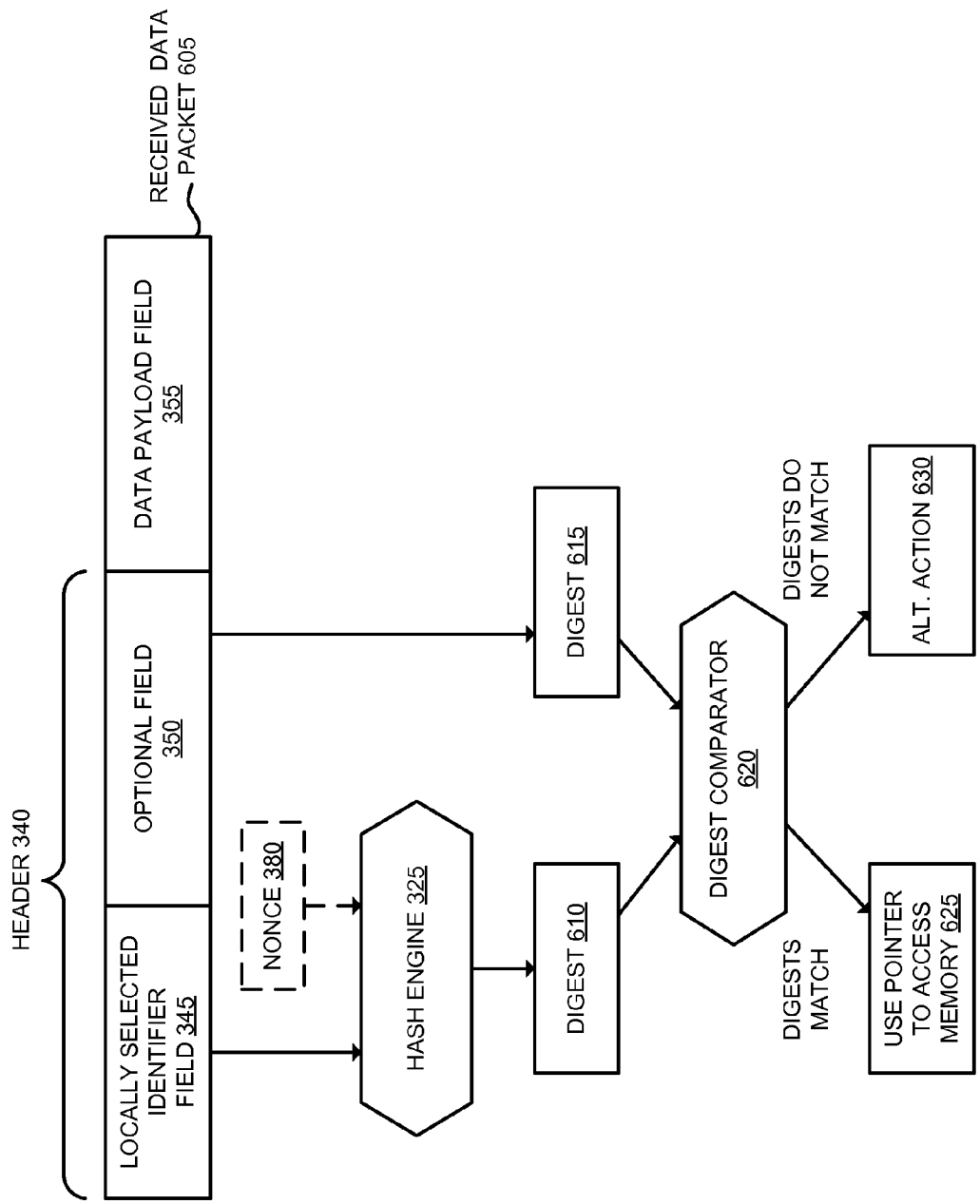
FIG. 6 illustrates validating a trusted pointer received in a data packet for those protocols with bidirectional identifiers according to one embodiment of the invention.

FIG. 6 illustrates validating a trusted pointer received in a data packet from a peer network element for protocols with bidirectional identifiers according to one embodiment of the invention. The operations described in reference to FIG. 6 are performed during processing of data packets for those protocols with bidirectional identifiers. The operations are performed in the data plane of a network element (e.g., performed on hardware in the line cards of the data plane of a network element). In one embodiment the operations described in reference to FIG. 6 are applicable to those protocols who use the embodiments described in reference to FIG. 3.

A line card in the network element receives the data packet 605. The received data packet 605 includes the header 340, which includes the locally selected identifier field 345 and the optional field 350, and the data payload field 355. The received data packet 605 is parsed and data in a first portion of the packet 605 (e.g., the data in the locally selected identifier field 345) and data in a second portion of the packet 605 (e.g., the data in the optional field 350) are extracted and written into packet buffer memory of the line card. The data extracted from the first portion (e.g., the locally selected identifier field 345) is provided to the hash engine 325 and the data extracted from the second portion (e.g., the optional field 350) is set as the digest 615, and is provided to the digest comparator 620. It should be understood that the term digest 615 is used for explanatory purposes as the data extracted from the second portion of the packet (e.g., from the optional field 350) may not have been generated from application of a hashing algorithm. If a nonce was used when generating the trusted pointer (e.g., as described in FIGS. 3-5), the same nonce value is provided to the hash engine 325.

Although not illustrated in FIG. 6, if the connection establishment sequences for the protocol corresponding to the received data packet 605 included an obfuscation of the data in the first portion (the data in the locally selected identifier field 345) and/or an obfuscation of the data in the second portion (the data in the optional field 350) of the packet, that data is deobfuscated prior to being provided to the hash engine 325 or the digest comparator 620. The instructions to deobfuscate can be included in the validation profile according to one embodiment of the invention.

The hash engine 325 applies a mathematical transformation (e.g., a hash algorithm) on the data extracted from the first portion of the received data packet 605 (e.g., the locally selected identifier field 345 (and the nonce 380 if used during creation of the trusted pointer)). The hash engine 325 uses the same hash algorithm as was used to generate the trusted pointer. The result of the mathematical transformation is the digest 610.

The digest comparator 620 compares the digests 610 and 615. If the digests match, then the value extracted from the first portion (e.g., the locally selected identifier field 345) is validated as a trusted pointer. The validated trusted pointer can then be trusted to access the connection memory 625 for the connection data corresponding to the received data packet 605 (e.g., the pointer is dereferenced). If the digests do not match, then alternative action is taken 630 (e.g., the packet is dropped, the packet is directed to the control plane for further processing, etc.).

Although FIG. 6 illustrates the received data packet 605 including the optional field 350, in some embodiments the received data packets do not include optional fields.

It should be understood that dereferencing a pointer allows a line card of a network to directly index into its memory to locate the connection data. On average, this is a faster lookup procedure than using conventional lookups such as using hash table or binary tree lookup mechanisms since it requires only a single memory lookup. In addition, unlike conventional lookup procedures, the lookup time is constant regardless of the number of connections. Additionally, the secure fast table lookup mechanism described above uses a predicable amount of memory.

Figure 7:
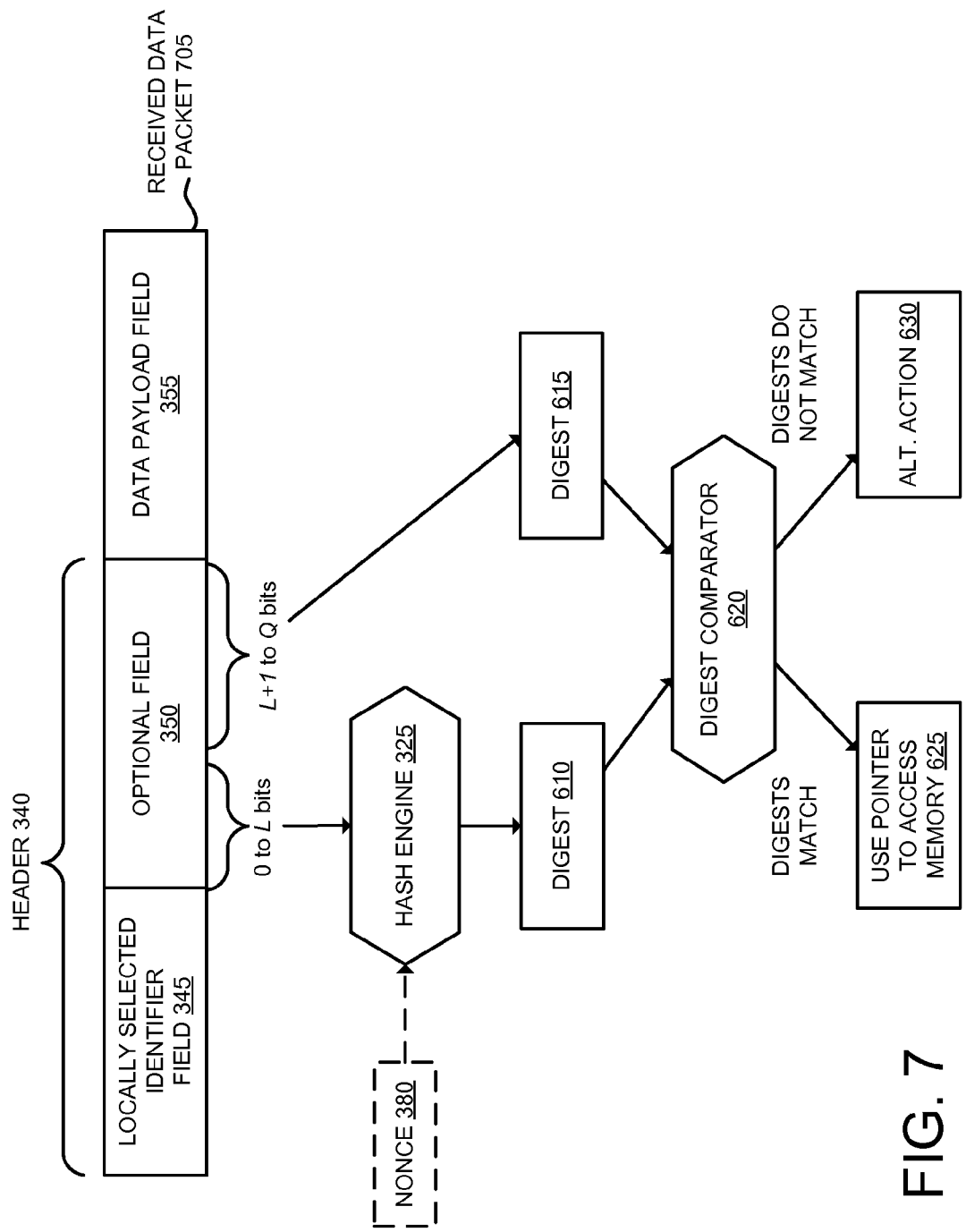
FIG. 7 illustrates an alternative way to validate a trusted pointer received in a data packet for those protocols with bidirectional identifiers according to one embodiment of the invention.

FIG. 7 illustrates an alternative way to validate a trusted pointer in a data packet received from a peer network for those protocols with bidirectional identifiers in one embodiment of the invention. Similarly as described with reference to FIG. 6, the operations described in reference to FIG. 7 are performed in the data plane of a network element (e.g., performed on hardware in the line cards of the data plane of the network element). In one embodiment, the operations described in reference to FIG. 7 are applicable to those protocols that use the embodiments described in reference to FIG. 4.

The operations of FIG. 7 are similar to the operations of FIG. 6 with the exception that the pointer value is included in the optional field 350 along with the digest of that pointer value (e.g., the pointer to the allocated connection data is encoded in the bits 0 to L of the optional field 350 and the digest of the allocated connection data is encoded in the bits L+1 to Q bits of the optional field 350). The data of the bits 0 to L of the optional field 350 are provided to the hash engine 425 and the data of the bits L+1 to Q of the optional field 350 is set as the digest 615. The hash engine 425 and the digest comparator 620 performs similar operations as described in reference to FIG. 6.

Figure 8:
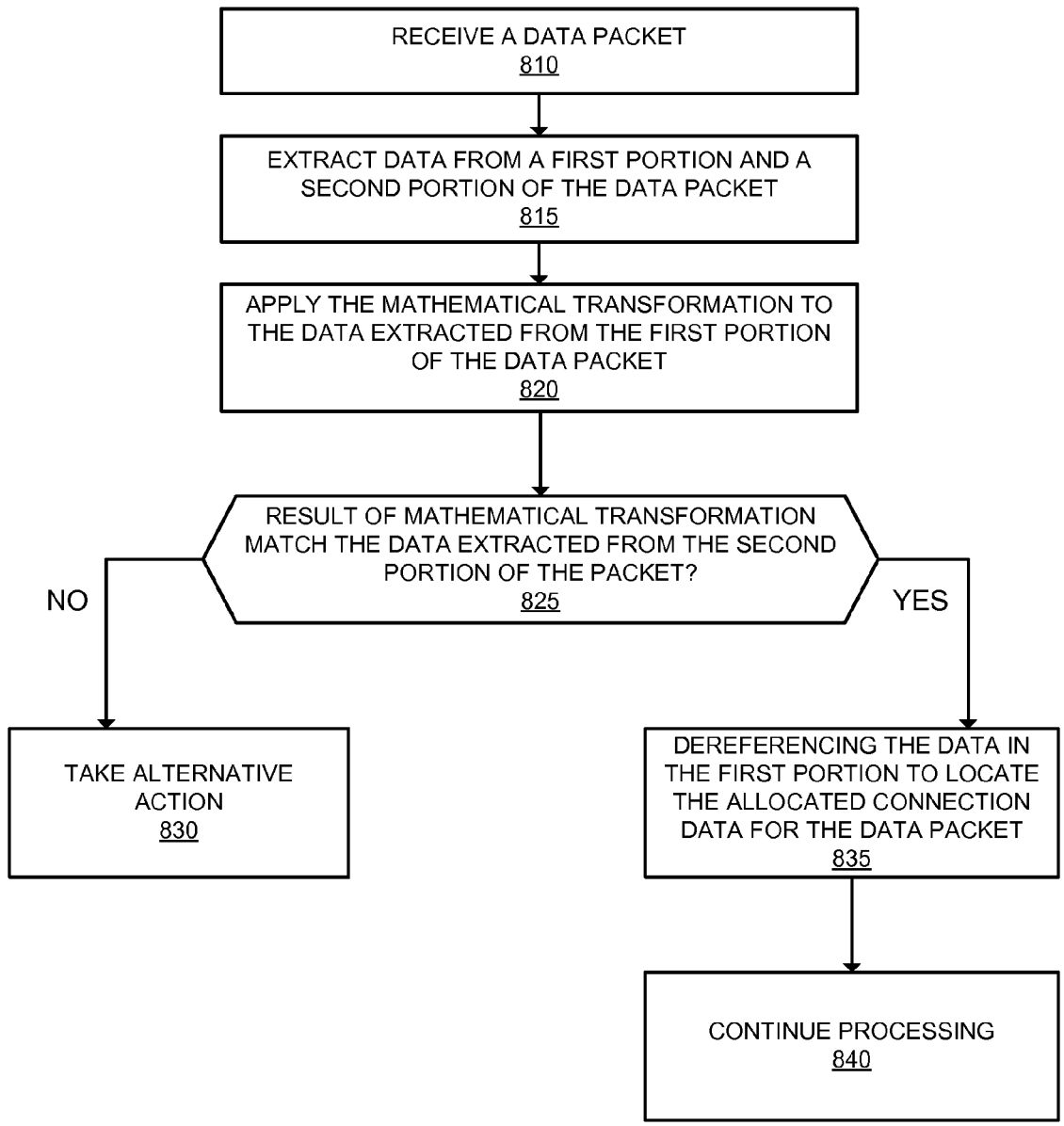
FIG. 8 is a flow diagram illustrating validating a trusted pointer received in a data packet for those protocols with bidirectional identifiers according to one embodiment of the invention.

FIG. 8 is a flow diagram illustrating validating a trusted pointer in a data packet received from a peer network for those protocols with bidirectional identifiers in one embodiment of the invention. The operations of FIG. 8 will be described with reference to the exemplary embodiment of FIG. 2. However, it should be understood that the operations of FIG. 8 can be performed by embodiments of the invention other than those discussed with reference to FIG. 2, and the embodiments discussed with reference to FIG. 2 can perform operations different than those discussed with reference to FIG. 8. The operations illustrated in FIG. 8 are performed on a line card within the network element 120.

At block 810, the packet parsing engine 215 receives a data packet and begins to parse the data packet. For example, with reference to FIG. 1, the packet parsing engine 215 receives a data packet from the network element 110, and determines that the packet is a data packet for a protocol with bidirectional identifiers. Flow moves from block 810 to block 815, where the packet parsing engine 215 extracts data from the first portion and a second portion of the data packet (e.g., from the header of the data packet) and writes the data into packet buffer memory. If the protocol is L2TP, in one embodiment the packet parsing engine 215 extracts data from the session ID field and the cookie field. Flow moves from block 815 to block 820.

At block 820, the hash engine 225 applies a mathematical transformation (e.g., a hash algorithm) to the data extracted from the first portion of the packet (e.g., data extracted from the session ID field for L2TP data packets). The hash engine 225 applies the same mathematical transformation as was used during connection establishment (e.g., the same mathematical transformation the hash engine 255 used). It should be understood that if a nonce value was used during connection establishment, the same nonce value is used by the hash engine 225 when applying the mathematical transformation. Flow moves from block 820 to block 825.

At block 825, the trusted pointer validation engine 220 compares the data extracted from the second portion of the packet (e.g., from the cookie field in L2TP data packets) with the result of the mathematical transformation performed by the hash engine 225. If the data matches (the data extracted from the first portion is a trusted pointer), then flow moves to block 835, otherwise flow moves to block 830 where alternative action is taken (e.g., the packet is dropped, the data plane attempts to use the information of the first portion of the packet (e.g., value in the session ID field) to lookup the connection data for that packet, the packet is forwarded to the control plane for further processing, etc.).

At block 835, the data extracted from the first portion of the packet (the trusted pointer) is dereferenced to locate the allocated connection data that corresponds with that data packet. Flow moves from block 835 to block 840 where the data plane continues processing the data packet.

In one embodiment, if the connection data is allocated to a portion of the memory that is dedicated for connection data, and the memory address range of that dedicated memory portion is known, prior to hashing the extracted data from the first portion of the received data packet (e.g., in block 820), it is determined whether the data extracted from the first portion points to the portion of memory that is dedicated for connection data. If the data extracted from the first portion of the packet points to a memory location that is in the range of memory dedicated to connection data, then the processing continues (e.g., the hashing in block 820 is performed), otherwise alternative action is taken (e.g., the packet is dropped, the packet is forwarded to the control plane for further processing, the data plane attempts to use the information of the first portion of the packet (e.g., value in the session ID field) to lookup the connection data for that packet, etc.).

It should be understood that embodiments of the invention do not require both sides of the connection (e.g., both of the network elements 110 and 120) to perform the operations described above (e.g., selecting a local identifier as a pointer to the connection data).

Figure 9:
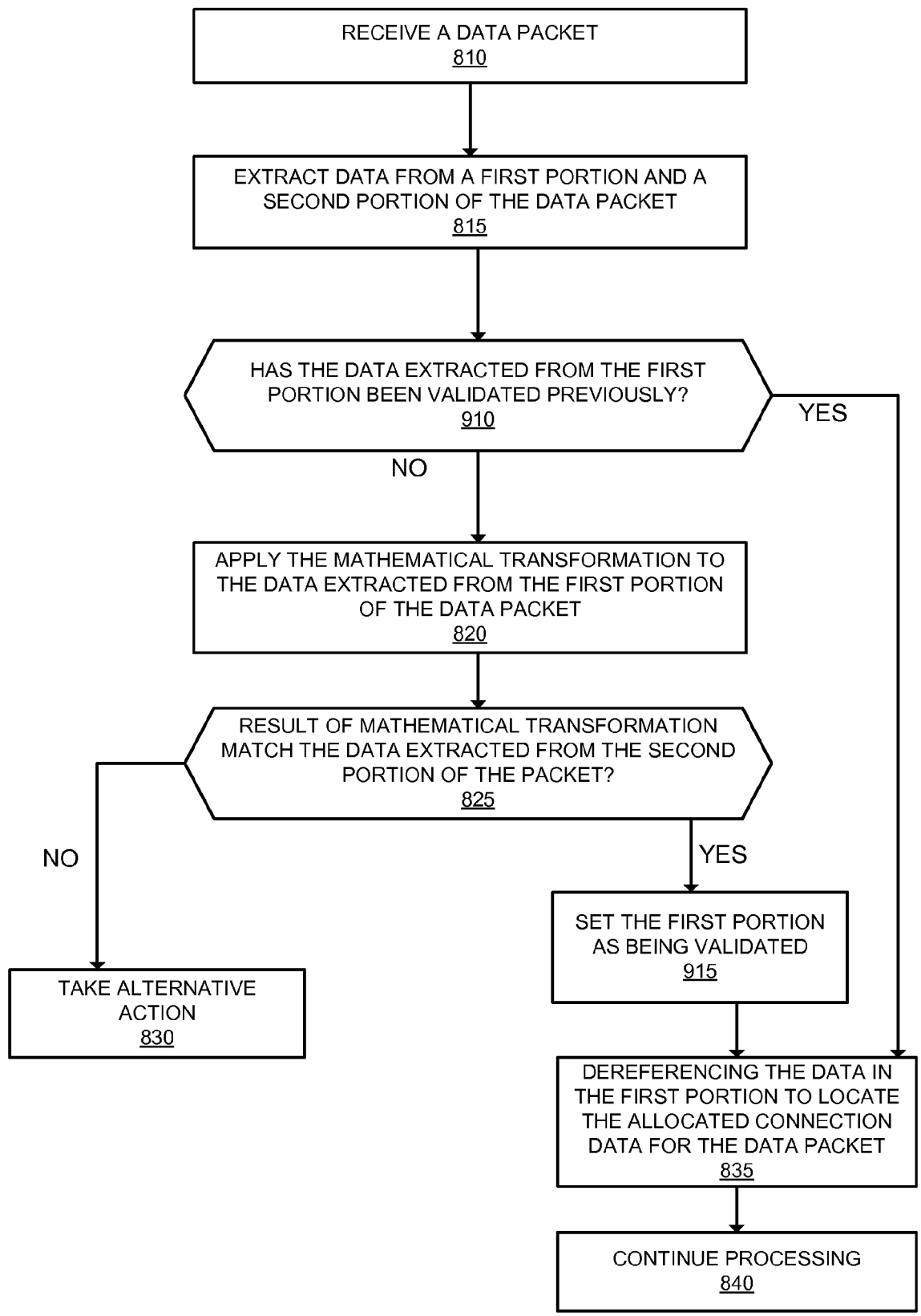
FIG. 9 is a flow diagram illustrating optional operations performed in the flow described in reference to FIG. 8 according to one embodiment of the invention.

In one embodiment of the invention, after initially validating a pointer as trusted, a flag is set in the data plane so that future data packets with that pointer can be trusted without performing additional mathematical transformations. FIG. 9 is a flow diagram illustrating optional operations performed in the flow described in reference to FIG. 8 according to one embodiment of the invention.

After performing the operation described in reference to block 815 of FIG. 8, flow moves to block 910 of FIG. 9, where a determination is made whether the data extracted from the first portion of the data packet has been validated previously. If the data extracted from the first portion has been previously validated, then flow moves to block 835 described in reference to FIG. 8, otherwise flow moves to block 825 described in reference to FIG. 8. In one embodiment, a bloom filter is used to record which ones of the pointer values have been validated and is shared across multiple ones of the pointer values, while in other embodiments a bitmap table is used to record previously validated pointer values. In one embodiment, the bloom filter and/or bitmap table are stored in a Static Random Access Memory (SRAM) of the line cards of the network element.

A bloom filter is a probabilistic representation used to determine whether an element is a member of a set. According to one embodiment, after the pointer value has initially been validated, the result of the mathematical transformation of the first portion (e.g., the hash digest) is represented in the bloom filter. In another embodiment, after the pointer value has initially been validated, a combination of that pointer value and the hash digest is represented in the bloom filter (e.g., the pointer value and hash digest are concatenated, the pointer value is added to the hash digest, the hash digest is shifted by an amount corresponding to the pointer value, etc.). This is described with reference to block 915 described later herein. In one embodiment, the hash digest is divided into multiple segments, a value is calculated for each of those segments, and the bits of the bloom filter that correspond with the set values are set. To determine whether the pointer has been trusted before (e.g., the hash is represented on the bloom filter), the data extracted from the second portion of the packet is divided into multiple segments, a value is calculated for each of those segments, and the bits of the bloom filter that correspond to those values are checked. If they are all set, then the pointer has been trusted before. However, if any of the bits are not set, then the pointer has not been previously validated. Of course other ways may be used to cache the results of the validation including using multiple bloom filters.

Referring back to FIG. 9, at block 825, if the data extracted from the second portion of the packet (e.g., from the cookie field in L2TP data packets) matches the result of the mathematical transformation performed by the hash engine 225, then flow moves to block 915, where the data from the first portion is set as being trusted. For example, if using a bloom filter, the data extracted from the second portion of the packet (and optionally combined with the data extracted from the first portion of the packet) is represented into the bloom filter (e.g., the data extracted from the second portion (or optionally the combination of the data extracted from the first and second portion) is divided into one or more segments, a value of each of those segments is calculated, and the bits of the bloom filter corresponding to those values are set). Flow then moves from block 915 to block 830 described in reference to FIG. 8.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element for fast table lookups of connection data associated with a connection of a protocol between the network element and a peer network element, the method comprising:
    transmitting a connection establishment packet to the peer network element to establish the connection between the network element and the peer network element, wherein the connection establishment packet includes a value representing a pointer to a memory location of the connection data stored in a memory of the network element; and
    responsive to receiving, from the peer network element, a first data packet of the protocol, performing the following:
        extracting data from a first portion of the first data packet indicating the value representing the pointer to the memory location of the connection data; and
        accessing the connection data at the memory location by dereferencing the extracted data.

2. The method of claim 1, wherein the connection establishment packet further includes a result of a mathematical transformation applied to the value representing the pointer, and the method further comprises:
    prior to accessing the connection data:
        applying the same mathematical transformation on the data extracted from the first portion of the first data packet; and
        determining that a result of the mathematical transformation applied to the data extracted from the first portion of the first data packet matches a second portion of the first data packet.

3. The method of claim 2, further comprising:
    in responsive to receiving, from the peer network element, a second data packet of the protocol, performing the following:
        applying the mathematical transformation on the data extracted from the first portion of the second data packet; and
        determining that a result of the mathematical transformation applied to the data extracted from the first portion of the second data packet does not match the second portion of the second data packet; and
        performing one of dropping the second data packet or directing the second data packet to a control plane of the network element for processing.

4. The method of claim 1, wherein the value representing the pointer to the memory location of the connection data is used as a local identifier to identify packets belonging to the connection between the network element and the peer network element.

5. The method of claim 2, wherein the protocol is Layer 2 Tunneling Protocol (L2TP), wherein the first portion of the first data packet corresponds with a session ID field, and wherein the second portion of the first data packet corresponds with a cookie field.

6. The method of claim 2, wherein a nonce value is used in the mathematical transformation.

7. The method of claim 2, wherein the result of the mathematical transformation applied to the value representing the pointer includes at least a portion of a first hash digest resulting from a one-way hash algorithm performed on the value representing the pointer, and the result of the mathematical transformation applied to the data extracted from the first portion of the first data packet includes at least a portion of a second hash digest resulting from the one-way hash algorithm performed on the data extracted from the first portion of the first data packet.

8. The method of claim 2, wherein the value representing the pointer to the memory location of the connection data is an obfuscation of the pointer, and the data extracted from the first portion of the first data packet is deobfuscated prior to applying the mathematical transformation to that data.

9. The method of claim 1, wherein the connection data includes at least one of quality of service (QoS) parameters, access control lists, and routing pointers to routing tables.

10. A network element to perform fast table lookups of connection data in connections using protocols with bidirectional identifiers, the network element comprising:
    a control plane including a protocol module to establish protocol connections, wherein the protocol module, for each protocol connection, is to:
        store connection data corresponding to the protocol connection at a memory location in a memory of a data plane of the network element, and
        establish the protocol connection with a protocol participating peer network element by negotiating with the protocol participating peer network element a local identifier, wherein the local identifier is a value representing a pointer to the memory location of the connection data; and
    a data plane coupled to the control plane, the data plane including,
        the memory for storing the connection data for each protocol connection, and
        a packet parsing engine to extract the local identifier in data packets received from the protocol participating peer network element for an established protocol connection, wherein the extracted local identifier is used to access the connection data associated with the established protocol connection by dereferencing the extracted local identifier.

11. The network element of claim 10, wherein the control plane further includes a first mathematical transformation engine to apply a mathematical transformation to the local identifier to generate a validation signature, and the validation signature is negotiated with the protocol participating peer network element along with the local identifier to establish the protocol connection.

12. The network element of claim 11, wherein the packet parsing engine is to extract the validation signature in data packets received from the protocol participating peer network element, and the data plane further includes:
    a second mathematical transformation engine to apply the mathematical transformation to the extracted local identifier; and
    a trusted pointer validation engine to compare the extracted validation signature to a result of applying the mathematical transformation to the extracted local identifier to determine if the extracted local identifier is trusted to be used to access the connection data associated with the established protocol.

13. The network element of claim 12, wherein the trusted pointer validation engine is to drop or direct to the control plane for processing those of the data packets received that have the extracted validation signature not matching the result of applying the mathematical transformation to the extracted local identifier.

14. The network element of claim 12, wherein the first mathematical transformation engine is a first hash engine that applies a hash algorithm, and the second mathematical transformation engine is a second hash engine that applies the same hash algorithm.

15. The network element of claim 14, wherein a nonce value is used in the hash algorithm.

16. The network element of claim 10, wherein the control plane further includes an obfuscation module to obfuscate the local identifier, and the data plane further includes a deobfuscation module to deobfuscate the extracted local identifier.

17. The network element of claim 10, wherein the protocol module is a Layer 2 Tunneling Protocol (L2TP) module.

18. The network element of claim 10, wherein the connection data corresponding to each protocol connection includes at least one of quality of service (QoS) parameters, access control lists, and routing pointers to routing tables for that protocol connection.

\* \* \* \* \*